United States Patent [19]

Aranovsky

[11] Patent Number: 5,550,502
[45] Date of Patent: Aug. 27, 1996

[54] CONTROL CIRCUIT AND METHOD FOR THIN FILM HEAD WRITED RIVER

[75] Inventor: Anatoly Aranovsky, Los Gatos, Calif.

[73] Assignee: GEC Plessey Semiconductors, Inc., Scotts Valley, Calif.

[21] Appl. No.: 447,978

[22] Filed: May 23, 1995

[51] Int. Cl.⁶ .................. H03K 17/56; H03K 3/00
[52] U.S. Cl. ............. 327/423; 327/110; 327/482; 327/588
[58] Field of Search ................. 327/423, 587, 327/482, 108, 110, 375, 579, 424, 494, 497, 588, 478, 362

[56] References Cited

U.S. PATENT DOCUMENTS 3,731,004  5/1973  Cowpland et al. ............ 327/110
3,770,986  11/1973 Drehle .......................... 327/110
4,420,786  12/1983 Toney .......................... 327/423
5,333,081   7/1994  Mitsui ......................... 327/110

FOREIGN PATENT DOCUMENTS 2014388  8/1979  United Kingdom ............ 327/110

Primary Examiner—Toan Tran
Attorney, Agent, or Firm—Fenwick & West LLP; Robert P. Sabath

[57] ABSTRACT

A write driver control circuit controls the voltage level input to a switch circuit, providing increased range for head voltage swings and fast current switching, providing a write driver circuit with a variable voltage level which tracks the write current, as well as temperature and process variations, but which is independent of power supply voltages.

6 Claims, 4 Drawing Sheets

CONTROL CIRCUIT AND METHOD FOR THIN FILM HEAD WRITED RIVER

FIELD OF INVENTION

This invention relates generally to control circuits and methods for thin film head write drivers, and more particularly to control circuits and methods for thin film head write drivers having an adaptive voltage level at the collector of a write current source transistor.

BACKGROUND OF THE INVENTION

In a typical hard disk drive, digital data is written onto magnetic media by changing the polarity of a write current, Iw, which is applied to an inductive write head as the head travels over the surface of the selected magnetic media. The write current produced and switched by the write circuit associated with a particular write head produces its write current in current pulses of selected amplitude having either a positive or negative fixed magnitude. In particular, the write circuit switches fixed magnitude current pulses between two oppositely directed yet equal magnitude values, i.e., +Iw and −Iw. The speed of current switching between these two values follows the relationship $V=L(di/dt)$. This can be rewritten as follows:

$$di/dt=V/L \qquad \text{equation (1)}$$

where di/dt is the change in current over time,

V is the voltage swing across the write head and

L is the inductance of the write head.

According to this relationship, the voltage swing across the head is critical to high speed current switching through the write head. Conventionally, write circuits include an H-type current switch including four transistors, a write current source, and an inductive write head. The H-type switch has two states, in which a particular pair of the transistors is on and the remaining pair of transistors is off (state one) or which the remaining pair of the transistors is on and the particular pair of transistors is off (state two). The two states differ in the direction of the write current flowing through the write head. The direction of current flow is controlled by data signals.

SUMMARY OF THE INVENTION

According to the present invention, a write driver control circuit minimizes the level of input voltage to an H-switch to provide increased headroom for head voltage swings and fast current switching. The write driver control circuit according to the present invention controls the voltage level input to a switch circuit, providing increased headroom for head voltage swings and fast current switching, permitting a variable input voltage level which tracks the write current, as well as temperature and process variations, but which is independent of power supply voltages.

DESCRIPTION OF THE DRAWINGS

FIG. 2b is a diagram of the write head voltage VHX on one side of the write head for the separate rise times indicated in FIG. 2a;

DESCRIPTION OF THE PREFERRED EMBODIMENT

Figure 1:
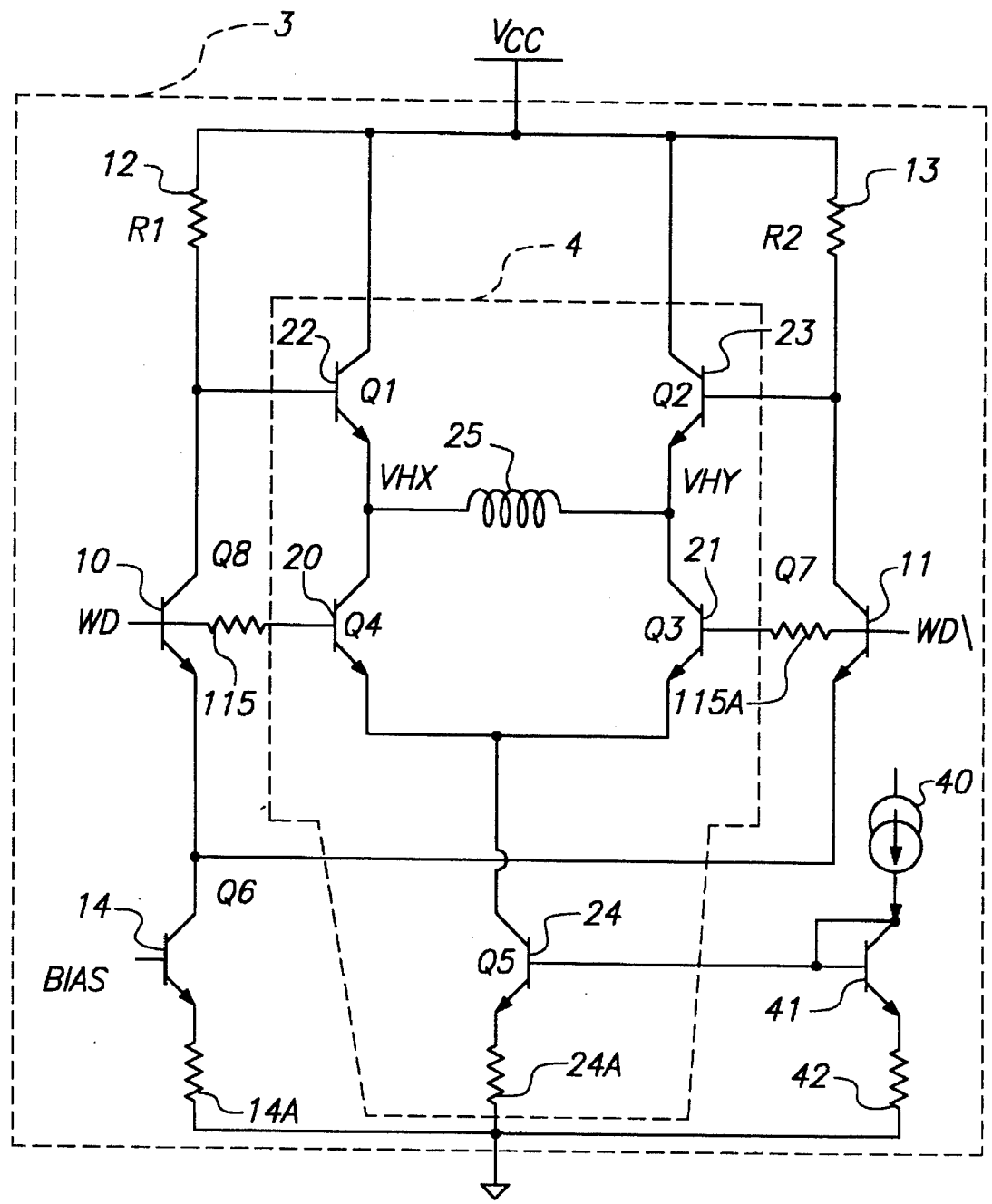
FIG. 1 is a diagram of a conventional write circuit including an H-type current switch including four transistors, a write current source, and an inductive write head.

FIG. 1 is a diagram of a conventional write circuit 3 including an H-type current switch 4. Conventional write circuit 3 particularly includes first and second input transistors respectively 10 and 11 and first and second resistors respectively 12 and 13 which connect first and second input transistors 10 and 11 to the voltage supply $V_{CC}$. Each of first and second input transistors 10 and 11 has a base, a collector, and an emitter. Conventional write circuit 3 further includes a bias transistor 14 which is connected to the emitter of transistor 10 as well as to the emitter of transistor 11. Conventional write circuit 3 further includes current limiting resistors 15 and 15A connected between the respective bases of transistors 10 and 20, and transistors 11 and 21. H-type current switch 4 includes four transistors respectively transistors 20, 21, 22, and 23 (respectively also referred to as transistors Q4, Q3, Q1 and Q2), a write current source transistor 24, a resistor 24A, and an inductive write head 25. The voltages at opposite terminals of inductive write head 25 are VHX and VHY. Each of transistors 20–24 has a base, a collector, and an emitter. Conventional write circuit 3 further includes a current source 40, a transistor 41, and a resistor 42. Transistor 41 has a base, a collector, and an emitter. Current source 40 is connected to the collector of transistor 41. Resistor 42 is connected between ground and the emitter of transistor 41. The collector of transistor 41 is connected to its base and to the base of transistor 24 in a conventional current mirror arrangement. Accordingly, the current flowing between the collector and emitter of transistor 41 (which is the same as the current produced by current source 40) produces a proportionately larger or smaller current between the collector and the emitter of transistor 24, depending on the relative sizes of transistors 41 and 24. Typically, transistor 24 is larger than transistor 41, and it may be an order of magnitude larger in terms of its current. Thus, a small current from current source 40 will produce a large current in transistor 24. H-type current switch 4 has two states, a first state in which each of a particular pair of the transistors, 21 and 22 (i.e., transistors Q3 and Q1) for example, is on, and the remaining pair of transistors, 20 and 23 (i.e., transistors Q4 and Q2) is off (state one); and a second state in which the remaining pair of the transistors, 20 and 23 (Q4 and Q2), is on and the particular pair of transistors 21 and 22, is off (state two). The two states of H-type current switch 4 differ in the direction of the write current flowing through write head 25. The change of states of H-type current switch 4 will cause a change in the direction of current through write head 25. The direction of current flow is controlled by write data signals, WD and WD\. The first state is achieved when WD<WD\, and the second state is achieved when WD>WD\. Conventionally, the negative going voltage spike at VHX is clamped approximately to voltage level VWD−VBE, where VWD is the voltage at input node WD and VBE the base to emitter voltage of a bipolar junction transistor used in conventional write circuit 3. If the voltage level VWD–VBE is not low enough, the amplitude of negative going voltage spike VHX will be limited, slowing down the current switching process. Accordingly, it is desirable to keep the voltage level corresponding to input signal WD as low as possible.

Figure 2A:
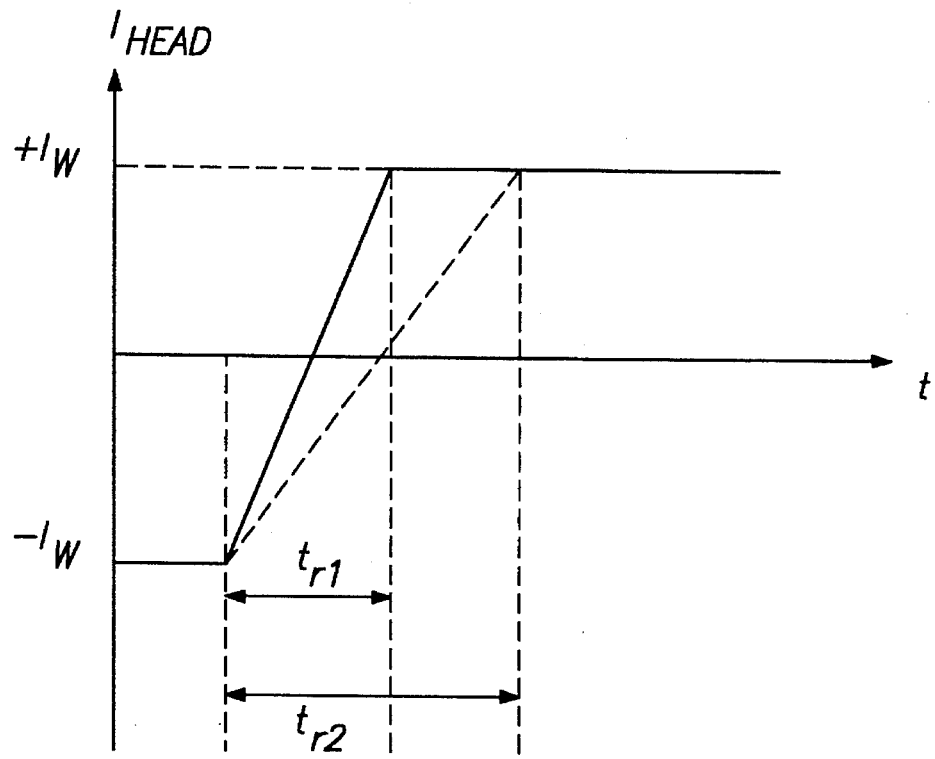
FIG. 2a is a diagram of the write current $I_{HEAD}$ through the write head in first and second rise times of the write current, $I_W$.
Figure 2B:
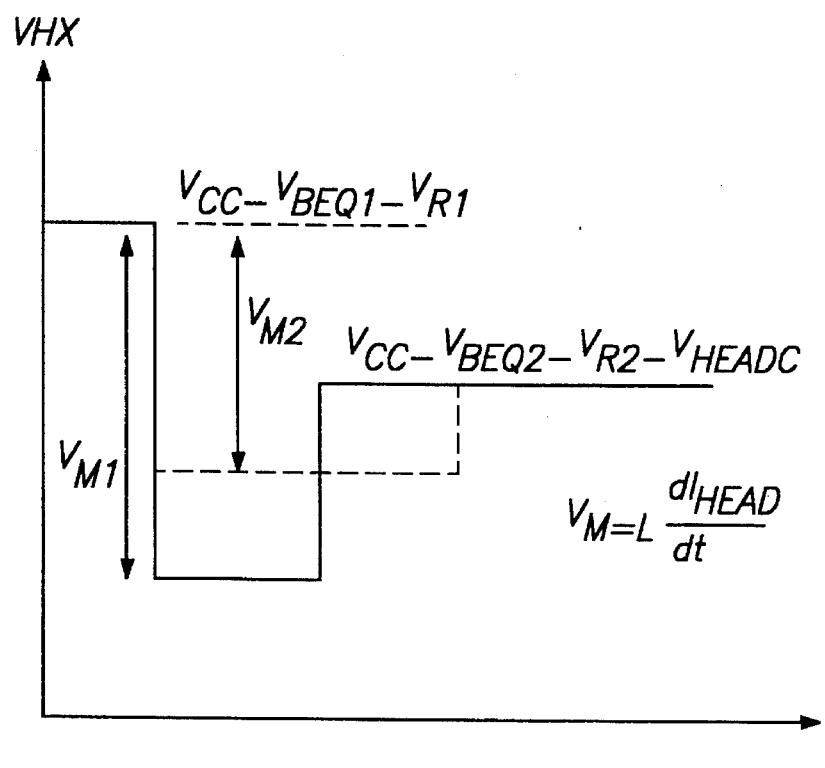

FIG. 2a is a diagram of the write current $I_{HEAD}$ through the write head 25 of FIG. 1 in first and second rise times of the write head current, $I_W$. FIG. 2b is a diagram of the write head voltage VHX on one side of the write head for the separate rise times indicated in FIG. 2a. Write head voltage VHX first undergoes an initial transition period when it changes from one state to another. FIGS. 2a and 2b show switching from a first state to a second state that will take place on a positive (low to high potential) transition of signal WD and a negative (high to low potential) transition of signal WD\. Equation (1) above suggests that the rate of current change is proportional to the amplitude of the negative-going switching spike VM. If VM1>VM2, then the rise time tr1<tr2. Notably, to achieve fast current switching, the voltage at the head terminal needs to swing as close to ground as possible. After the transition state is completed for write head voltage VHX, the transition from state one to state two results is VHX changing from a voltage level $V_{CC}-V_{BEQ1}-V_{R1}$ to $V_{CC}-V_{BEQ2}-V_{R2}-V_{HEAD}$, where $V_{CC}$ is the supply voltage, $V_{BEQ1}$ is the base to emitter voltage of transistor Q1, $V_{R1}$ is the voltage across R1, $V_{BEQ2}$ is the base to emitter voltage of transistor Q2, $V_{R2}$ is the voltage across R2, and $V_{HEAD}$ is the voltage across write head 25.

Figure 3:
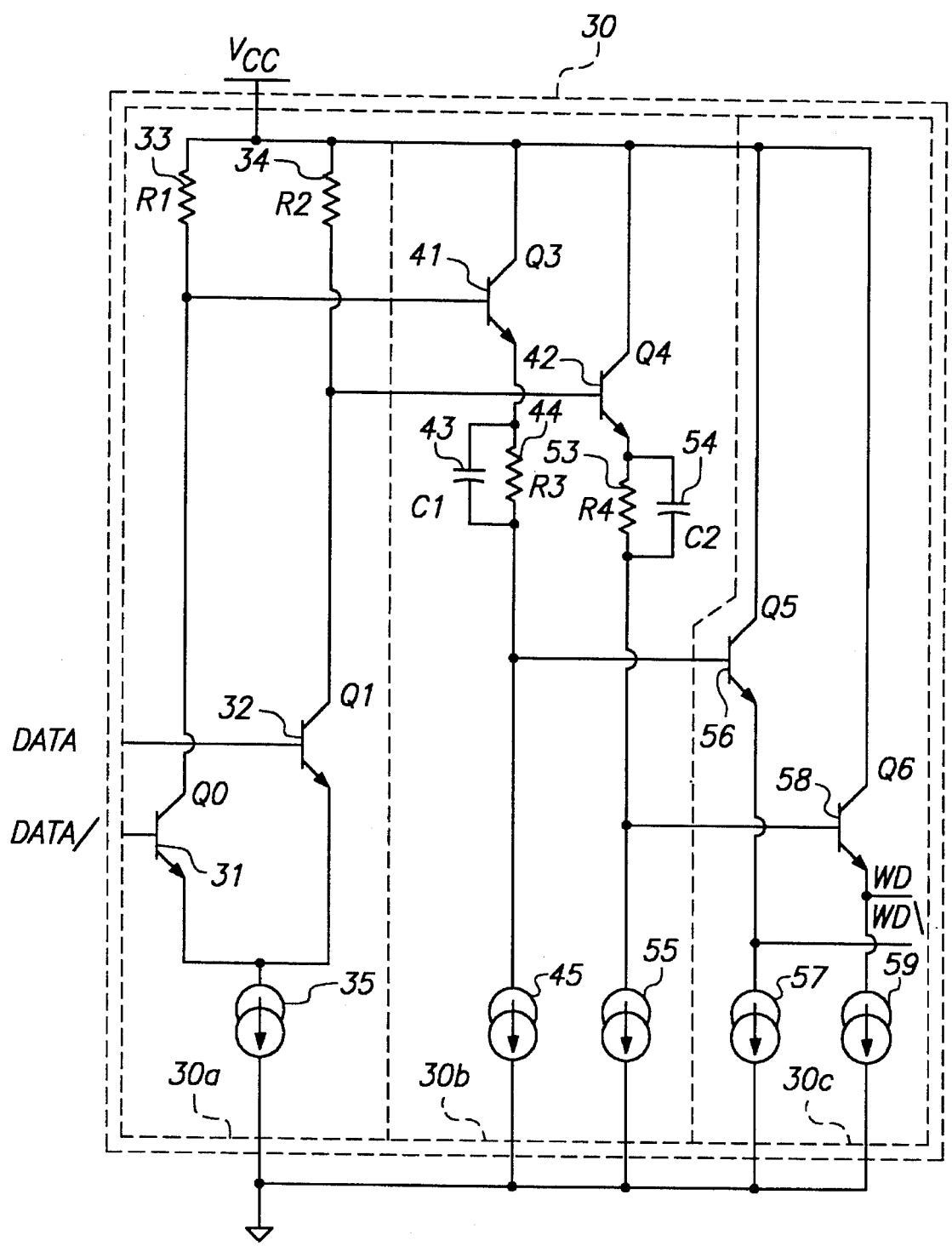
FIG. 3 is a circuit diagram of an electric circuit according to the prior art, that produces signals WD and WD\.

FIG. 3 is a circuit diagram of a differential voltage signal producing circuit 30 according to the prior art, that produces signals WD and WD\. Differential voltage signal producing circuit 30 includes a differential stage 30a, a level shifter stage 30b, and an emitter follower stage 30c. Differential stage 30a includes first and second transistors 31 and 32 (respectively $Q_0$ and $Q_1$), corresponding first and second resistors 33 and 34 (respectively R1 and R2) which connect the respective collectors of first and second transistors 31 and 32 to $V_{CC}$, and current source 35 which is connected to the emitter of transistor 31 and to the emitter of transistor 32. Voltage swing at the collectors of transistors Q0 and Q1 is selected to be large enough to guarantee full current switching of write driver transistors in FIG. 1, including transistors 10, 11, 20, and 21. Level shifter stage 30b controls voltage level VWD and includes first and second transistors 41 and 42 (respectively $Q_3$ and $Q_4$), a first capacitor 43, a first resistor 44 in parallel with said first capacitor, and a current source 45 in series with said first capacitor 43 and said first resistor 44. The level of VWD is selected to be low enough to provide enough voltage swing across write head 25, and high enough to prevent saturation of voltage source transistor 25 in FIG. 1 while taking into account temperature, power supply, and process variations. Typically, consideration of temperature, power supply, and process variations results in a higher voltage level VWD, and a consequent slower switching speed. This is disadvantageous. The collector of first transistor $Q_3$ and the collector of the second transistor $Q_4$ are connected to $V_{CC}$. The emitter of first transistor $Q_3$ is connected to first capacitor 43 and first resistor 44. Current source 45 is connected as well to first capacitor 43 and first resistor 44. but on the opposite side of these components with respect to transistor $Q_3$. Level shifter stage 30b further includes a second resistor 53, a second capacitor 54 in parallel with said second resistor 53, and a current source 55 in series with said second capacitor 54 and said second resistor 53. The emitter of first transistor $Q_4$ is connected to second capacitor 54 and second resistor 53. Current source 55 is connected as well to second capacitor 54 and second resistor 53, but on the opposite side of these components with respect to transistor $Q_4$. Emitter follower state 30c includes a first transistor 56 (i.e., $Q_5$) in series with a first current source 57, and a second transistor 58 (i.e., $Q_6$) in series with a second current source 59. First transistor 56 and first current source 57 are connected respectively between VCC and ground, and second transistor 58 and second current source 59 are connected between $V_{CC}$ and ground. The connection node between first transistor 56 and first current source 57 produces output signal WD/, and the connection node between second transistor 58 and second current node 59 produces complementary output signal WD.

Figure 4:
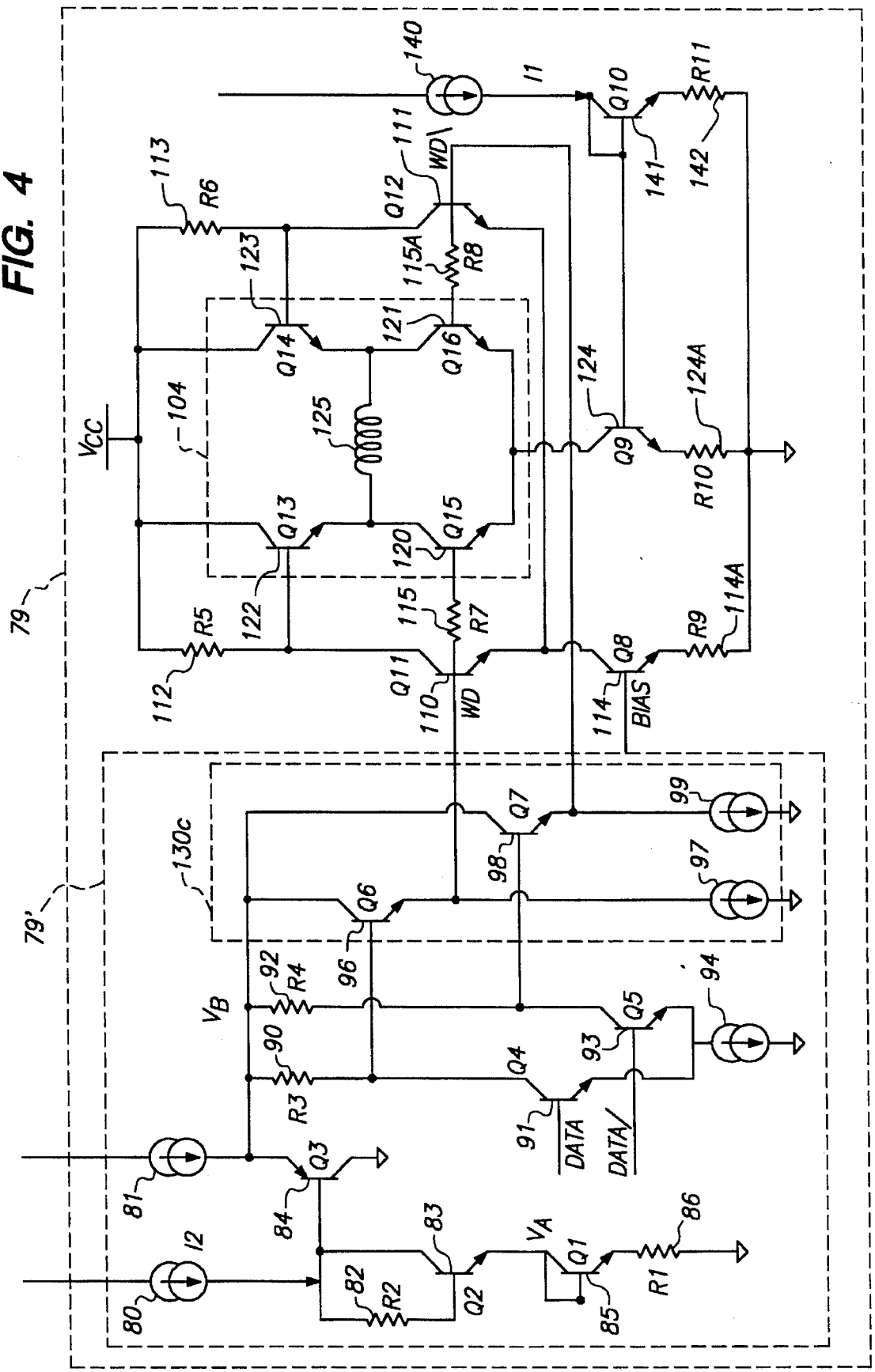
FIG. 4 is a diagram according to the present invention showing a write driver control circuit for minimizing the level of VWD to provide increased headroom for head voltage swings and fast current switching.

FIG. 4 is a diagram of a write driver circuit 79 including a control circuit 79' according to the present invention, which minimizes the level of VWD to provide increased headroom for head voltage swings and fast current switching. Write driver control circuit 79 according to the present invention includes first and second current sources 80 and 81, resistor 82, transistors 83–85, and resistor 86. Resistor 82 is connected across the base and collector of transistor 83. The base and collector of transistor 85 are connected to each other. The emitter of transistor 85 is connected to one side of resistor 86, and the other side of resistor 86 is connected to ground. The emitter of transistor 83 is connected to the collector of transistor 85. The collector of transistor 83 is connected to the base of transistor 84. The collector of transistor 84 is connected to ground. Current source 80 provides electric current to transistor 83. Current source 81 provides electric current to transistor 84 and is connected to transistor 84 at node VB. Write driver control circuit 79 according to the present invention further includes resistor 90, transistor 91, resistor 92, transistor 93, and current source 94. Resistors 90 and 92 are connected at one side to each other at node VB and at their respective other sides to the respective collectors of transistors 91 and 93. Current source 94 is connected to the emitter of transistor 91 and the emitter of transistor 93. Write driver control circuit 79 according to the present invention includes additionally transistor 96, current source 97, transistor 98, and current source 99. In particular, the emitter of transistor 96 is connected to current source 97, and the emitter of transistor 98 is connected to current source 99. Further, the base of transistor 96 is connected to resistor 90 and to the collector of transistor 91. The base of transistor 98 is connected to resistor 92 and to the collector of transistor 93. The emitter of transistor 96 provides output signal WD, and the emitter of transistor 98 provides output signal WD\. Write driver control circuit 79 according to the present invention includes additionally transistors 110 and 111 which are respectively connected to VCC through respective resistors 112 and 113. The bases of respective transistors 120 and 121 are connected through respective resistors 115 and 115A to WD and WD\. Write driver control circuit 79 according to the present invention includes additionally transistor 114 and resistor 114A which is connected to ground. The base of transistor 114 is provided with a bias voltage, BIAS. The collector of transistor 114 is connected to the emitter of transistor 110 and to the emitter transistor 111. Write driver control circuit 79 according to the present invention further includes an H-type current switch 104 which in turn includes four transistors respectively transistors 120, 121, 122, and 123 (respectively also referred to as transistors Q15, Q16, Q13 and Q14), a write current source transistor 124, a write current source resistor 124A, and an inductive write head 125. The voltages at opposite terminals of inductive write head 25 are VHX AND VHY. Each of transistors 120–123 has a base, a collector, and an emitter. H-type current switch 104 has two states, a first state in which each of a particular pair of the transistors, 121 and 122 (i.e., transistors Q13 and Q16) for example, is on, and the remaining pair of transistors, 120 and 123 (i.e., transistors Q15 and Q14) is off (state one); and a second state in which the remaining pair of the transistors, 120 and 123 (Q15 and Q14), is on and the particular pair of transistors 121 and 122, is off (state two). The two states of H-type current switch 4 differ in the direction of the write current flowing through write head 125. The change of states of H-type current switch 4 will cause a change in the direction of current through write head 125. The direction of current flow is controlled by write data signals, WD and WD\. The first state is achieved when WD<WD\, and the second state is achieved when WD>WD\. Write driver circuit 79 includes additionally transistor 124 and resistor 124A which is connected to ground. The emitter of transistor 124 is connected to resistor 124A, and the collector of transistor 124 is connected to the emitter of transistor 120 and to the emitter of transistor 121. Write driver circuit 79 includes additionally current source 140, transistor 141, and resistor 142 which is connected to ground. The emitter of transistor 141 is connected to resistor 142, the base and collector of transistor 141 are connected to each other and to current source 140. In accordance with the present invention, to prevent current source transistor 124 from reaching saturation, its collector voltage is controlled to be equal its base voltage, i.e., Vcb=0. The following relationships hold true under the limitations set forth:

$$Vb(Q9)=Iw*R10+Vbe(Q9), \qquad \text{equation (2)}$$

where Vb(Q9) is the base voltage of transistor Q9,
R10 is the resistance of resistor 124A,
Vbe(Q9) is the base to emitter voltage of transistor Q9, and
Iw is the current through head 125.

$$VR1=R1*I2=R1*Iw/k, \qquad \text{equation (3)}$$

where VR1 is the voltage across resistor 86,
R1 is the resistance of resistor 86,
I2 is the current from current source 80,
Iw is the current through head 125, and
k is a selected scaling constant such that R1=k*R10.
k can, for example, be equal to 20.
This relationship is founded upon current source I2 tracking current source I1.
Accordingly, $$VR1=k*R10*Iw/k=Iw*R10, \qquad \text{equation(3')}$$

where the variables indicated have the same meanings as above. With respect to particular values, the emitter of transistor Q1 is selected to be "k" times smaller than that of transistor Q9. Thus, $$Vbe(Q1)=Vbe(Q9), \qquad \text{equation (4)}$$

where Vbe (Q1) is the base to emitter voltage of transistor Q1, and Vbe(Q9) is the base to emitter voltage of transistor Q9.
Further, $$VA=Vb(Q9), \qquad \text{equation (5)}$$

where VA is the voltage at the collector of transistor 85, and Vb(q9) is the base voltage of transistor Q9.
Further, potential VB corresponds to data level WD in state 2 when WD>WD/, according to the following relationship:

$$VB=VA+Vbe(Q2)+Ib(Q2)*R2+Vbe(Q3), \qquad \text{equation (6)}$$

where VB is the voltage at the emitter of transistor Q3,
VA is the voltage at the collector of transistor 85,
Vbe(Q2) is the base to emitter voltage of transistor Q2,
Ib(Q2) is the base current of transistor Q2,
R2 is the resistance of resistor 82, and
Vbe(Q3) is the base to emitter voltage of transistor Q3.
The voltage at the collector of transistor Q9 is:

$$Vc(Q9)=VB-Vbe(Q6)-Ib(Q15)*R7-Vbe(Q15), \qquad \text{equation (7)}$$

Vc(Q9) is the collector voltage of transistor Q9,
VB is the emitter voltage of transistor Q3,
Vbe(Q9) is the base to emitter voltage of transistor Q9,
Ib(Q15) is the base current of transistor Q15,
R7 is the resistance of resistor 115, and
Vbe(Q15) is the base to emitter voltage of transistor Q15.
Substituting equation (6) into equation (7) produces the relationships:

$$\begin{aligned}Vc(Q9) &= VA + Vbe(Q2) + Ib(Q2)*R2 + \\ &\quad Vbe(Q3) - Vbe(Q6) - Ib(Q15)R7 - Vbe(Q15) = \\ &\quad VA + [Vbe(Q2) - Vbe(Q15)] + [Ib(Q2)*R2 - \\ &\quad Ib(Q15)*R7] + [Vbe(Q3) - Vbe(Q6)],\end{aligned} \qquad \text{equation (8)}$$

where vc(Q9) is the collector voltage of transistor Q9,
VA is the collector voltage of transistor Q1,
Ib(Q2) is the base current of transistor Q2,
R2 is the resistance of resistor 82,
Ib(Q15) is the base current of transistor Q15,
R7 is the resistance of resistor 115,
Vbe(Q15) is the base to emitter voltage of transistor Q15,
Vbe(Q2) is the base to emitter voltage of transistor Q2,
Vbe(Q3) is the base to emitter voltage of transistor Q3, and
Vbe(Q6) is the base to emitter voltage of transistor Q6.
Transistors Q2 and Q15 are selected according to the relationship, that the emitter area of Q2 equals (1/k) times the emitter area of transistor Q15. Further, transistors Q3 and Q6 are selected approximately to equalize their respective base to emitter voltages. Similarly, transistor Q1 is modeled after transistor Q9. Additionally, current $I2=I_{W/k}$. Accordingly, the second and fourth terms of the above equation reduce to zero and cancel out of the relationship.
Further, by selecting R2/R7=Ib(Q15)/Ib(Q2)=k, then the third term zeros out as well, reducing the relationship to Vc(Q9)=VA. Accordingly, collector voltage of the current source transistor is maintained equal to its base voltage and Vcb=0 independent of temperature, power supply, or process variations. Further, base to emitter voltages Vbe compensate each other and current sources I1 and I2 track each other.

What is claimed is:
1. A control circuit for a write drive current switch having first, second, third and fourth transistors (Q13, Q15, Q14, Q16); an inductive write head having first and second sides; and a write current source transistor having a base node, an emitter node, and a collector node, said write current source transistor being connected at its collector node to second and fourth transistors of a write drive current switch; said first, second, third, and fourth transistors being connected to said inductive write head; said first and second transistors being connected to each other at said first side of said write head, and said third and fourth transistors being connected to each other at said second side of said write head, said first and third transistors being connected between said inductive write head and VCC, said control circuit comprising:

fifth, sixth, and seventh transistors (Q3, Q2, Q1) each having a base, a collector, and an emitter, the base of said fifth transistor being connected to the collector of said sixth transistor, and the emitter of said sixth transistor being connected to the collector of said seventh transistor, wherein the emitter of said seventh transistor (Q1) is structured to have an emitter area 1/k times emitter area of the write current source transistor (Q9), and wherein the base-to-emitter voltage drop across said sixth transistor (Q2) is substantially equal to the base-to-emitter voltage drop across said second transistor (Q15);

a first current source (I2) connected to the collector of said sixth transistor (Q2) wherein the current of said first current source equals 1/k times the current through the write current source transistor (Q9), where k is a selected scale factor; and a circuit connected between the emitter of said fifth transistor (Q3) and the write drive current switch, said circuitry including first (Q6) and second Q7) switching transistors, wherein the base to emitter voltages of said fifth transistor (Q3) and said first and second switching transistors are substantially equalized.

2. The control circuit according to claim 1, further comprising:

a first interface resistor (R7) connecting said first switch transistors (Q6) to the base of said second transistor (QI5); and a second resistor (R2) connected between the base and collector of said sixth transistor (Q2), wherein the resistance of the second resistor equals k times the resistance of said first interface resistor, where k is a selected scale factor.

3. The control circuit according to claim 1, further comprising:

a first interface resistor (R8) connecting said second switch transistor (Q7) to the base of said fourth transistor (Q16); and a second resistor (R2) connected between the base and collector of said sixth transistor (Q2), wherein the resistance of the second resistor equals k times the resistance of said first interface resistor, where k is a selected scale factor.

4. The control circuit according to claim 1, further comprising a first resistor (R10) connected between the emitter of said write current source transistor and ground, and a second resistor (R1) connected to the emitter of said seventh transistor (Q1) and ground, wherein the resistance of the first resistor equals 1/k times the resistance of said second resistor, where k is a selected scale factor.

5. The control circuit according to claim 1, wherein k=20.

6. A method for controlling a write drive current switch having first, second, third and fourth transistors (Q13, Q15, Q14, Q16); an inductive write head having first and second sides; and a write current source transistor having a base node, an emitter node, and a collector node, said write current source transistor (Q9) being connected at its collector node to second and fourth transistors of a write drive current switch; said first, second, third, and fourth transistors being connected to said inductive write head; said first and second transistors being connected to each other at said first side of said write head, and said third and fourth transistors being connected to each other at said second side of said write head, said first and third transistors being connected between said inductive write head and VCC, said method including the step of:

establishing a scaled circuit representation of the second transistor (Q15) and write circuit source transistor (Q9) to set the maximum voltage level at the base of the second transistor at a level to maintain the base and collector voltages of the write circuit source transistor substantially equal to each other.

* * * * *

UNITED STATES PATENT AND TRADEMARK OFFICE
CERTIFICATE OF CORRECTION

PATENT NO. : 5,550,502
DATED : August 27, 1996
INVENTOR(S) : Anatoly Aranovsky

It is certified that error appears in the above-indentified patent and that said Letters Patent is hereby corrected as shown below:

On the title page, item [54] and column 1,
   In the title, delete "WRITED DRIVER" and insert --WRITE DRIVER--.

Signed and Sealed this

Tenth Day of December, 1996

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,550,502
DATED : August 27, 1996
INVENTOR(S) : Anatoly Aranovsky

It is certified that error appears in the above-indentified patent and that said Letters Patent is hereby corrected as shown below:

Title page, item [54], delete "WRITED RIVER" and insert --WRITE DRIVER--.

At Column 1, line 2, delete "WRITED RIVER" and insert --WRITE DRIVER--.

This Certificate supersedes Certificate of Correction issued December 10, 1996.

Signed and Sealed this

Fifteenth Day of April, 1997

Attest:

BRUCE LEHMAN

*Attesting Officer*  *Commissioner of Patents and Trademarks*